9878X

J. HORTON.

PLATFORM BALANCE.

Patented July 2, 1836.

98784 John Sterlen. Madrid N.Y. July 2, 1836

Letters Patent

The schedule referred to in these Letters Patent and making part of the same containing a description in the words of the said John Sterlen himself of his improvement in the platform Scale or Balance for weighing heavy bodies To all whom it may concern be it known that I John Sterlen of the town of Madrid County of St Lawrence and State of New York have made certain improvements in the machine for weighing heavy bodies, and I hereby declare that the following is a full, perfect and exact description of the machine as improved, reference being had to the drawings which accompany this specification, and make a part thereof. I also declare that in these drawings and in this description I have represented and described many parts which are common to other machines for the same purpose this I have done for the purpose of more clearly shewing & explaining wherein I claim to have made improvement.

Figure 1:
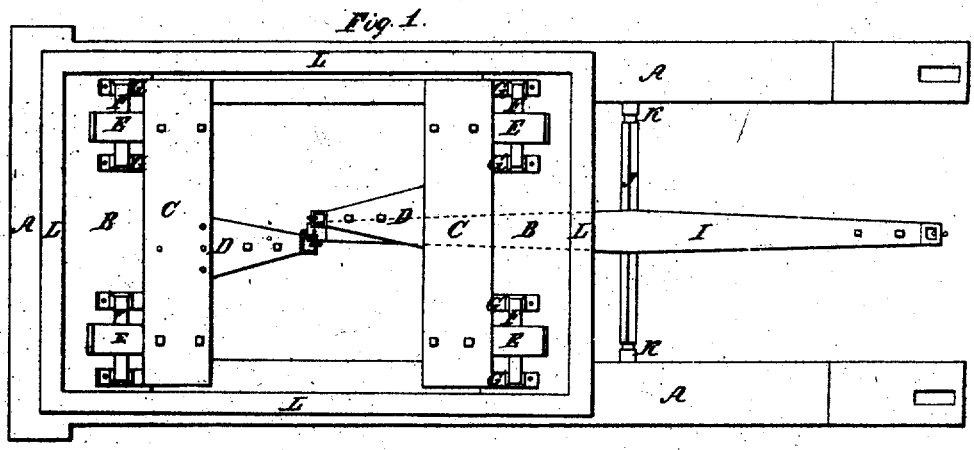

Fig 1 Represents the machine with the platform removed shewing the arrangement of the fulcra & levers. &c. [illegible] is the exterior frame of the machine made of timber or other suitable materials [illegible] are the sills or cross pieces extending across of the machine on which the fulcra & hinges rest. [illegible] are arms of the middle levers, firmly attached to the cross pieces [illegible] and meeting in the centre of the machine directly over the end of the main balance lever. The arms aforesaid, or acting parts of the middle levers) are furnished with knife edged pieces of hardened steel cast iron or other hard metal. ([illegible] Fig 1) on which said knife edges a double hook [illegible] rests and connects the arms aforesaid to the end of the balance lever 1

Figure 4:
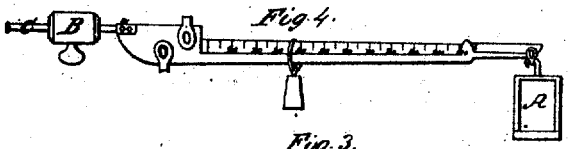

C.C are cross pieces of oak or other suitable timber or metal to which are fixed the double knife edged pieces or hinges (see Fig 5) E.E. Are pieces of hardened steel cast iron or other hard metal which are firmly fixed to the cross pieces [illegible] forming [illegible] the resisting and part of the acting part of the middle [illegible] and are furnished with upper and lower knife edges, the lower of which rests in the
flute of the swinging fulcra or bail forming the centre of the lever of the middle
levers and the upper designed to receive and sustain the weight of the platform.
The upper and lower knife edges are on a hori-
zontal line with the knife edge on the end of the lever. D. D. are swinging
fulcra or bails having semi circular grooves or flutes in which work the lower
knife edge of that part of the middle levers last above described having knife edges
on each side resting on standards G.G. are standards made of hardened steel
cast iron or other hard metal resting on and fixed to the cross pieces A.B. and
having [illegible] flutes or notches in the top with guards on the outer side which form
fulcra in which the knife edges of the swinging fulcra or bails work (See Fig-
ure [illegible] in the plate) which give a swinging motion to the levers and cause
the levers to accommodate themselves to the rise and fall of the platform without
friction or scraping on the knife edges. H.H. are pieces of hardened steel cast
iron or other hard metal which are fastened to the acting ends of the levers having
knife edges on which work the connecting hooks I. is a beam of oak or other
suitable wood having knife edged pieces [illegible] fastened to each of its ends a
hook is attached to the exterior end of this beam a lever working over the knife
edge which is on the lower side from which a connecting rod of wrought iron
reaches to the steel yards. The inner end is connected to the centre levers by means
of a double hook which is made steel and elastic and works over the lower
knife edge [illegible] on the lever [illegible] and the upper knife edges [illegible] on levers [illegible]
[illegible] is a gudgeon made of hardened steel or
cast iron and is fixed into and forms the centre of motion in the main balance
lever [illegible] equidistant from its ends with knife edges on the upper side of each of
its ends to work in the ear pieces K.K. are ear pieces of hardened steel cast
iron or other hard metal which are fixed to the timber [illegible] forming fulcra
which in the knife edges of the gudgeon [illegible] work. [illegible] are timbers of pine or other timber
dovetailed or otherwise fixed together forming a box around the apparatus
Figure [illegible] represents the under side of the platform
[illegible] are part of the frame work. A.B. are cross pieces made of oak or other suit-
able timber. C.C.C.C. are pieces of hardened steel cast iron or other hard metal
having grooves or flutes with guards on the outer side which form fulcra for which the knife edges resting on [illegible] of the Middle levers [illegible]. Fig 4 is a steel yard
of what is called the Dearborn Patent improved by me and adapted to my
platform balance. It is made in the usual way of steel yards of that kind with
a moveable poise with notches and figures on the bar, but at the end [illegible]
pivot through the bar with knife edges on the upper side of each end, over which
(a double hook plays to which) the stirrup C A is attached by means of a hook
for the reception of weights. C. Is a smooth round rod of iron attached to the
end of the steel yard bar on which the ball d. slips. d. is a ball of iron prepared
with a hole of the size of the rod C. on which it slips with a thumb screw inser
-ted through the side to the centre of the ball and which fastens the ball when
required to the rod C. The object had in view by [illegible] use of the rod and ball
when attached to the steel yard is to form a counterpoise to the platform prepar
-atory to weighing.

Figure 5:
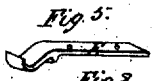
Figure 7:
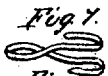
Figure 8:
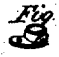
Figure 6:
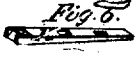
Figure 3:
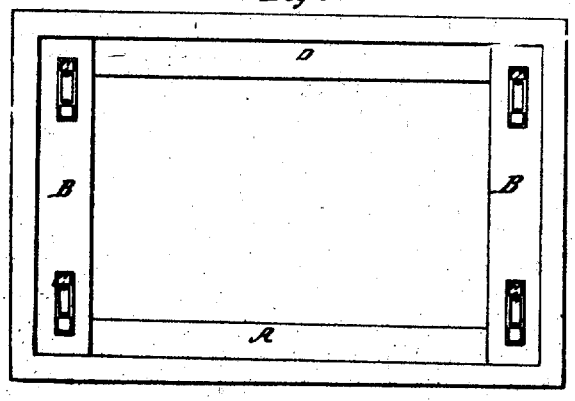
Figure 9:
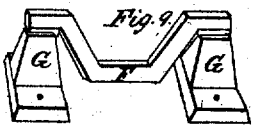
Figure 10:
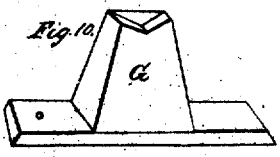

Common sealed weights bearing a given value to each other
are proposed to be placed in the stirrup C A. The steel yard being graduated with
the moveable poise to weigh any number of pounds from one to a hundred. The weights
placed in the stirrup C A may denote 100. 200 300, 500, or 1000 or any other number
of pounds the moveable poise will point out the number of pounds between the
hundreds. These numbers are given only to explain the principle and is applicable
to weights of any required amount and may be graduated to any sized scales Fig 5 is a perspective representation of the double knife edged
hinge E.E. the lower knife edge of which forms the centre of motion of the middle
lever and works in the swinging fulcrum or bail. F. The upper edge rests in the
fulcra G.G. Fig 8 and receives and sustains the weight of the platform Fig. 6 is a perspective representation of the knife edges H. H.
Fig 7 is a representation of the double hook which connects the levers in the centre
of the machine. Fig 8 is a perspective representation of the [illegible] or fulcra
K.K. Fig 9 is a perspective view of the swinging fulcra or bails showing the manner
in which they rest on the standards. Fig 10 is a perspective representation of one of
the standards showing the bevel plate or notch in which the knife edge of the
swinging bails or fulcra are designed to rest.

In constructing a machine for weighing loaded waggons
(as only described) in such a manner in the arrangement of the levers &c that the balance or lever bar which runs from the middle or centre levers may be carried out to the side by so doing retaining the same principles and action of the levers.

The machine as constructed for stores may be either portable or let into the floor so that the platform will be level therewith and the balance lever may be lengthened or shortened without altering the graduation of the steel yard by so doing I am enabled to attach the steel yard to the end of the balance lever at any distance from the platform and in any position that may be required retaining the same graduation of the balance lever when lengthened or shortened to reach the steel yard.

Figure 2:
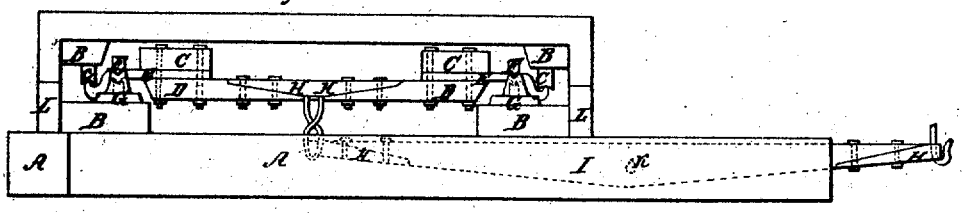

What I claim as an improvement upon the weighing machines now in use is the variation in the manner of arranging and connecting together the levers as shown in figures 1 and 2 giving the acting part of the centre levers on a [illegible] motion which are upon the first order of lever purchase. I also claim the variation in the manner of arranging the swinging fulcra or bails resting upon standards as seen in fig 2 which imparts a vibratory or swinging motion in the supporting frame by means of said standards and bails. I also claim the manner of fixing and placing the main balance lever by means of which the power is conveyed from the centre levers to the steel yard rod by means of its connection to the centre lever with the double hook as seen in figure 2. (form see fig 7) I also claim an improvement upon the steel yard by the manner in which I combine the graduated weight at the end by means of the pivot through the end of the bar and the hook which resting upon its knife edge to which the [illegible] is attached for the reception of the weights also the manner of counterpoising the platform to bring it into equilibrium preparatory to weighing by the means of the [illegible] rod attached to the extreme end of the steel yard bar, and the [illegible] ball with the screw seen through its side which is made to slide on said rod to produce the proper balance (see fig 4) not intending however by these claims to confine myself to the exact form and manner of constructing the various parts of my machine as herein exemplified but to vary the same as I may find convenient in any way which produces similar effects upon the same principles and modes of action.

In testimony that the foregoing is a true specification 1297 9870X 1441.

of my said indenture as herein before described have hereunto set my hand this twelfth day of October in the Year of our Lord one thousand Eight Hundred and thirty five Witness
Chas Gethickspell
Thos Whipell.

John Stokes

Exd.
M.G.

2112 WDJ

2000

Drawing